(12) United States Patent
Fink

(10) Patent No.: US 10,948,092 B2
(45) Date of Patent: Mar. 16, 2021

(54) FLAPPER VALVE WITH IMPROVED FLAPPER

(71) Applicant: FMC Technologies, Inc., Houston, TX (US)

(72) Inventor: Daniel R. Fink, Porter, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 15/746,772

(22) PCT Filed: Aug. 19, 2016

(86) PCT No.: PCT/US2016/047842
§ 371 (c)(1),
(2) Date: Jan. 22, 2018

(87) PCT Pub. No.: WO2017/031449
PCT Pub. Date: Feb. 23, 2017

(65) Prior Publication Data
US 2018/0209555 A1    Jul. 26, 2018

Related U.S. Application Data

(60) Provisional application No. 62/207,885, filed on Aug. 20, 2015.

(51) Int. Cl.
*F16K 15/03* (2006.01)
*F16K 25/00* (2006.01)
*F16K 27/02* (2006.01)

(52) U.S. Cl.
CPC ............ *F16K 15/03* (2013.01); *F16K 25/005* (2013.01); *F16K 27/0227* (2013.01)

(58) Field of Classification Search
CPC ........ F16K 1/16; F16K 1/2261; F16K 1/2268; F16K 1/18; F16K 1/20; F16K 1/2014;
(Continued)

(56) References Cited

U.S. PATENT DOCUMENTS 3,172,424 A    3/1965  Stillwagon
3,186,682 A *  6/1965  Pierson ................. F16K 1/2268
                                                                     251/306

(Continued)

FOREIGN PATENT DOCUMENTS

DE    27 34 229 A1    2/1979
FR       1354301 A *  3/1964  ............... F16K 1/36
GB     2 056 623 A    3/1981

*Primary Examiner* — Hailey K. Do
(74) *Attorney, Agent, or Firm* — Henry C. Query, Jr.

(57) ABSTRACT

A flapper valve having a valve body which includes first and second ends, a flow bore which extends between the first and second ends, and an enlarged diameter cavity which is formed coaxially within the flow bore; a valve seat which comprises a through bore that is aligned with the flow bore; a retainer which is positioned radially outwardly of the cavity; and a flapper which is pivotally connected to the retainer. The flapper includes a sealing side which is configured to engage the valve seat when the flapper is in a closed position, a core which is made of a rigid material, a circular stop ring which is connected to or formed integrally with the core on the sealing side of the flapper and is configured to engage the valve seat when the flapper is in the closed position, and a resilient coating.

13 Claims, 10 Drawing Sheets

(58) Field of Classification Search
CPC .... F16K 1/2028; F16K 1/2035; F16K 1/2042; F16K 1/205; F16K 1/2078; F16K 1/22; F16K 1/226; F16K 1/222; F16K 1/36; F16K 1/46; F16K 15/02; F16K 15/03; F16K 15/033; F16K 25/005; F16K 1/2021; F16K 15/035; F16K 15/036; F16K 15/038

See application file for complete search history.

(56) References Cited

U.S. PATENT DOCUMENTS

| | | | | |
|---|---|---|---|---|
| 3,289,693 | A | * | 12/1966 | Scaramucci ............ F16K 15/03 137/515.5 |
| 3,295,550 | A | * | 1/1967 | Scaramucci ............ F16K 15/03 137/527.4 |
| 3,526,385 | A | * | 9/1970 | Rohrer ................... F16K 1/2261 251/306 |
| 4,274,436 | A | | 6/1981 | Smith |
| 4,457,376 | A | | 7/1984 | Carmody et al. |
| 4,469,122 | A | | 9/1984 | Meek |
| 4,604,254 | A | * | 8/1986 | Yamamoto ............ F16K 1/2261 137/375 |
| 4,825,902 | A | | 5/1989 | Helms |
| 4,854,342 | A | | 8/1989 | Polan |
| 9,022,347 | B2 | * | 5/2015 | Tatarek ............ B29C 45/14311 251/331 |
| 2007/0272306 | A1 | | 11/2007 | Trotin et al. |
| 2010/0263744 | A1 | * | 10/2010 | Witkowski .............. F16K 15/03 137/527.4 |

\* cited by examiner

FLAPPER VALVE WITH IMPROVED FLAPPER

This application is based on and claims the benefit of U.S. Provisional Patent Application No. 62/207,885, which was filed on Aug. 20, 2015.

BACKGROUND OF THE INVENTION

The present invention relates generally to flapper valves having a flapper on which a resilient coating is disposed in order to increase the sealing effectiveness of the valve. In particular, the invention relates to a flapper valve having an improved flapper which is configured to prevent the resilient coating from undergoing plastic deformation and consequently failing under relatively high operating pressures.

Typical prior art flapper valves have a flapper which is configured to engage a valve seat that is positioned across a flow bore extending through the valve. The flapper is pivotally connected by a pivot pin to a retainer ring which is mounted in the body of the valve above the flow bore. During normal flow conditions the flapper is maintained in a raised, open position by the flow, but when pressure downstream of the valve increases, the flapper pivots to a closed position under the influence of gravity and seals against the valve seat to thereby prevent backflow through the valve. In order to enhance the sealing ability of the valve, the flapper is sometimes coated with a resilient material, such as a urethane. However, when the pressure in the flow bore exceeds the compressive strength of the resilient coating, the coating can undergo plastic deformation, which can reduce the sealing effectiveness of the flapper valve. Also, when the flapper valve is used with abrasive fluids, the pivot pin is subject to undue wear when the flapper is repeatedly pivoted open and closed.

SUMMARY OF THE INVENTION

In accordance with the present invention, these and other problems in the prior art are addressed by providing a flapper valve having a valve body which includes first and second ends, a flow bore which extends between the first and second ends, and an enlarged diameter cavity which is formed coaxially within the flow bore; a valve seat which comprises a through bore that is aligned with the flow bore; a retainer which is positioned radially outwardly of the cavity; and a flapper which is pivotally connected to the retainer. The flapper comprises a sealing side which is configured to engage the valve seat when the flapper is in a closed position; a core which is made of a rigid material; a circular stop ring which is connected to or formed integrally with the core on the sealing side of the flapper, the stop ring being configured to engage the valve seat when the flapper is in the closed position; and a resilient coating which includes at least one of a radially inner portion that is disposed on the core radially inwardly of the stop ring and a radially outer portion that is disposed on the core radially outwardly of the stop ring, the inner and outer portions being configured to sealingly engage the valve seat when the flapper is in the closed position. The stop ring and the radially inner and outer portions are configured such that, as the flapper moves into the closed position, the radially inner and outer portions will engage the valve seat before the stop ring engages the valve seat. In this manner, the stop ring limits the extent to which the radially inner and outer portions are compressed against the valve seat when the flapper is in the closed position.

In accordance with an aspect of the invention, at least one of a radially outer periphery of the inner radial portion and a radially inner periphery of the outer radial portion is beveled to thereby define a space into which the coating can be displaced when the flapper is in the closed position.

In accordance with another aspect of the invention, the stop ring and the radially inner and outer portions are dimensioned such that, when the flapper valve is pressurized to a maximum working pressure, a resulting pressure exerted on the radially inner and outer portions does not exceeding a compressive strength of the coating.

In accordance with yet another aspect of the invention, the stop ring is configured to form a uniformly tight fit with the valve seat to thereby prevent the radially outer portion from extruding through an interface between the stop ring and the valve seat.

In one embodiment of the invention, the flapper is pivotally connected to the retainer by a pivot pin which is positioned in a through hole that extends through a hinge portion of the flapper, and wherein the flapper valve further comprises means for sealing the pivot pin from a fluid in the cavity. The means for sealing the pivot pin may include a pair of resilient rings, each of which is positioned in a corresponding end of the through hole and comprises an inner diameter which is smaller than a diameter of the through hole. In this embodiment, the resilient rings may be formed integrally with the resilient coating, and they may be positioned in corresponding recesses which are located in the ends of the through hole.

In another embodiment of the invention, the means for sealing the pivot pin may include a pair of resilient circular ridges, each of which projects from a corresponding side of the hinge portion coaxially with the through hole and sealingly engages the retainer. In this embodiment, the resilient circular ridges may be formed integrally with the resilient coating.

In a further embodiment of the invention, the means for sealing the pivot pin may include both a pair of resilient rings, each of which is positioned in a corresponding end of the through hole and comprises an inner diameter which is smaller than a diameter of the through hole, and a pair of resilient circular ridges, each of which projects from a corresponding side of the hinge portion coaxially with the through hole and sealingly engages the retainer. In this embodiment, the resilient rings and the resilient circular ridges may be formed integrally with each other. Alternatively or in addition, the resilient rings and the resilient circular ridges may be formed integrally with the resilient coating.

In accordance with yet another embodiment of the present invention, a flapper valve is provided which comprises a valve body which includes first and second ends, a flow bore which extends between the first and second ends, and an enlarged diameter cavity which is formed coaxially within the flow bore; a valve seat which comprises a through bore that is aligned with the flow bore; a retainer which is positioned radially outwardly of the cavity; and a flapper which is pivotally connected to the retainer. The flapper comprises a sealing side which is configured to engage the valve seat when the flapper is in a closed position; a core which is made of a rigid material; and a resilient coating which is disposed on at least a portion of the core. The flapper is pivotally connected to the retainer by a pivot pin which is positioned in a through hole that extends through a hinge portion of the flapper, and the flapper valve further comprises means for sealing the pivot pin from a fluid in the cavity.

In accordance with one aspect of the invention, the means for sealing the pivot pin may include a pair of resilient rings, each of which is positioned in a corresponding end of the through hole and comprises an inner diameter which is smaller than a diameter of the through hole. In this embodiment, the resilient rings may be formed integrally with the resilient coating, and they may be positioned in corresponding recesses which are located in the ends of the through hole.

In accordance with another aspect of the invention, the means for sealing the pivot pin may include a pair of resilient circular ridges, each of which projects from a corresponding side of the hinge portion coaxially with the through hole and sealingly engages the retainer. In this embodiment, the resilient circular ridges may be formed integrally with the resilient coating.

In accordance with yet another aspect of the invention, the means for sealing the pivot pin may include both a pair of resilient rings, each of which is positioned in a corresponding end of the through hole and comprises an inner diameter which is smaller than a diameter of the through hole, and a pair of resilient circular ridges, each of which projects from a corresponding side of the hinge portion coaxially with the through hole and sealingly engages the retainer. In this embodiment, the resilient rings and the resilient circular ridges may be formed integrally with each other. Alternatively or in addition, the resilient rings and the resilient circular ridges may be formed integrally with the resilient coating.

In a further embodiment of the invention, the flapper also includes a circular stop ring which is connected to or formed integrally with the core on the sealing side of the flapper, the stop ring being configured to engage the valve seat when the flapper is in the closed position. In this embodiment, the resilient coating includes at least one of a radially inner portion that is disposed on the core radially inwardly of the stop ring and a radially outer portion that is disposed on the core radially outwardly of the stop ring, the inner and outer portions being configured to sealingly engage the valve seat when the flapper is in the closed position. Furthermore, the stop ring and the radially inner and outer portions are configured such that, as the flapper moves into the closed position, the radially inner and outer portions will engage the valve seat before the stop ring engages the valve seat. IN this manner, the stop ring limits the extent to which the radially inner and outer portions are compressed against the valve seat when the flapper is in the closed position.

In accordance with one aspect of the invention, at least one of a radially outer periphery of the inner radial portion and a radially inner periphery of the outer radial portion may be beveled to thereby define a space into which the coating can be displaced when the flapper is in the closed position.

In accordance with another aspect of the invention, the stop ring and the radially inner and outer portions may be dimensioned such that, when the flapper valve is pressurized to a maximum working pressure, a resulting pressure exerted on the radially inner and outer portions does not exceeding a compressive strength of the coating.

In accordance with a further aspect of the invention, the stop ring is configured to form a uniformly tight fit with the valve seat to thereby prevent the radially outer portion from extruding through an interface between the stop ring and the valve seat.

Thus, the improved flapper of the present invention is capable of reducing or eliminating plastic deformation of the resilient coating, thereby maintaining the sealing effectiveness of the flapper valve. In general, the flapper is provided with a stop ring which limits the extent to which the resilient coating is compressed against the valve seat when the flapper is in its closed position. The stop ring is configured to engage the valve seat and thereby prevent the pressure exerted on the resilient coating from exceeding the compressive strength of the coating. As a result, the resilient coating will not plastically deform but instead will maintain an effective seal against the valve seat.

In addition, the improved flapper may include means for sealing the pivot pin from the fluid in the flapper valve to thereby reduce or eliminate abrasive wear of the pivot pin. Such means may include resilient cylindrical rings which are positioned in corresponding recesses in the ends of the through hole in which the pivot pin resides and resilient circular ridges which project from the sides of the flapper from around the ends of the through hole. The rings and ridges are ideally formed as part of the resilient coating and are preferably contiguous with each other. The ridges are configured such that, when the flapper is mounted in the retainer ring, the ridges will be squeezed against the inner sides of the retainer ring and form a barrier against entry of the abrasive fluid into the through hole. This action will in turn compress the rings against the pivot pin and further prevent the abrasive fluid from contacting the pivot pin.

These and other objects and advantages of the present invention will be made apparent from the following detailed description with reference to the accompanying drawings. In the drawings, the same reference numbers are used to denote similar components in the various embodiments.

DETAILED DESCRIPTION OF THE INVENTION

Figure 1:
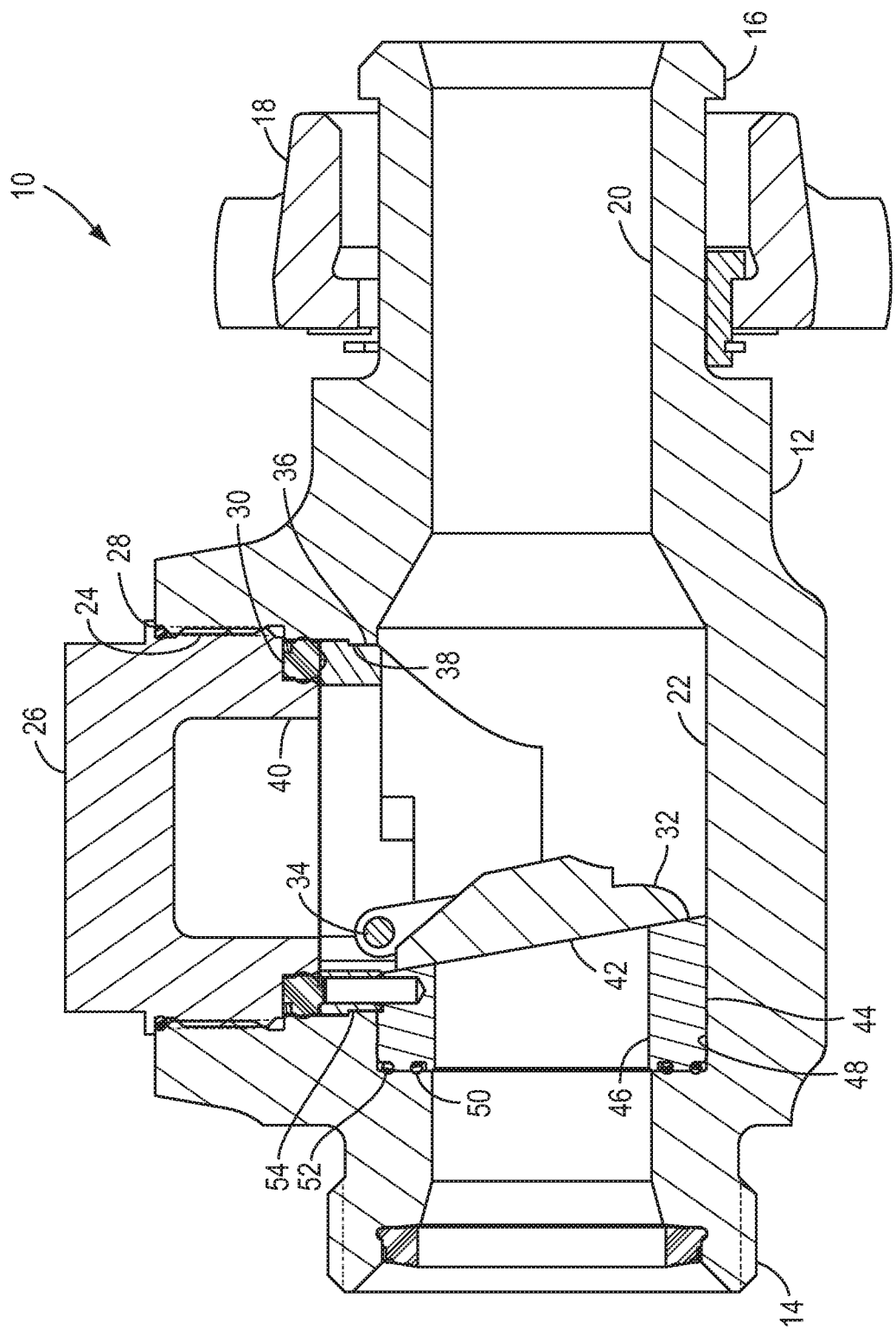
FIG. 1 is a cross sectional view of an illustrative prior art flapper valve.
Figure 2:
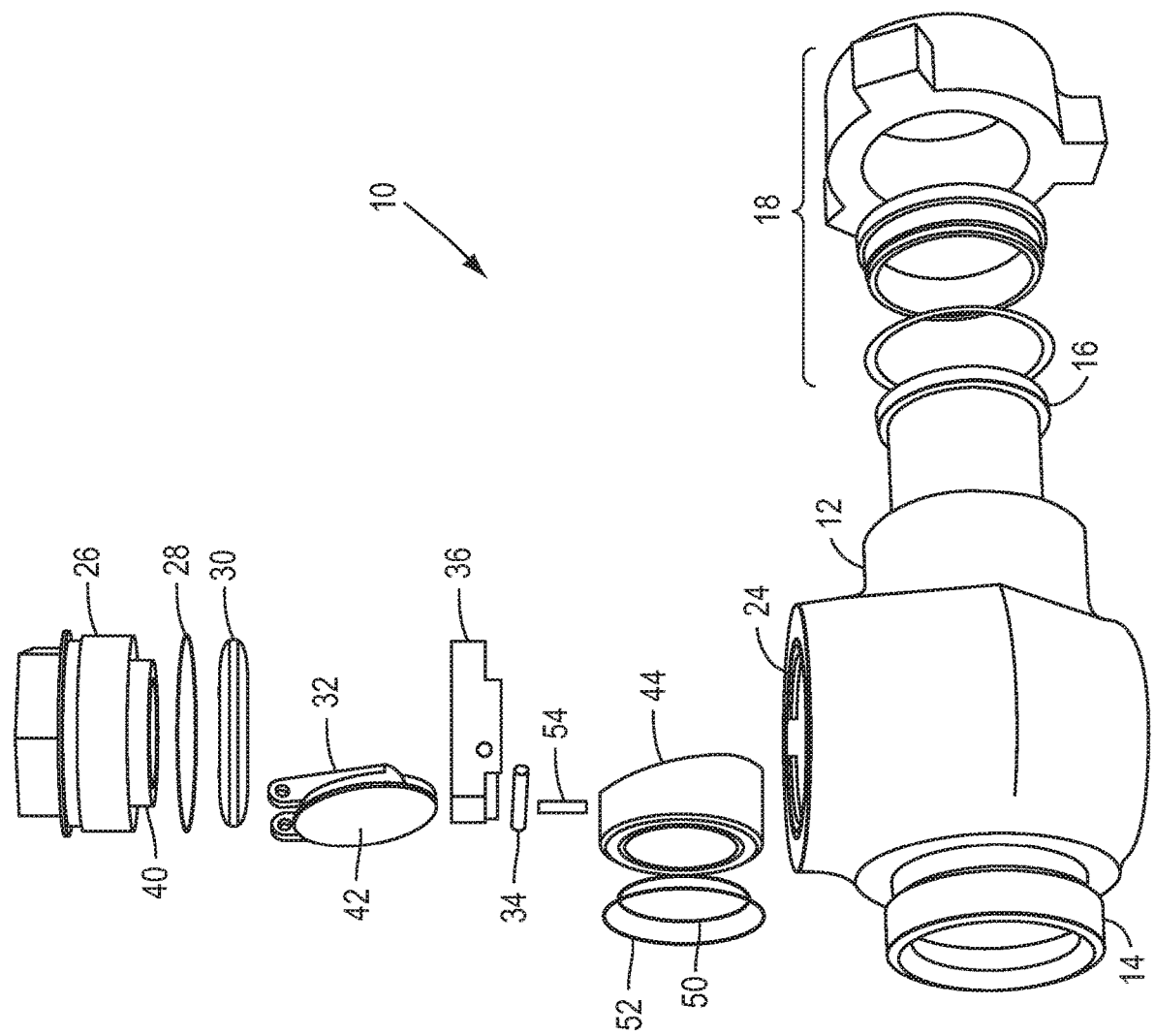
FIG. 2 is an exploded view of the flapper valve shown in FIG. 1.

As context for the present invention, an exemplary prior art flapper valve will first be described with reference to FIGS. 1 and 2. This prior art flapper valve, which is indicated generally by reference number 10, is shown to comprise a valve body 12 having first and second ends 14, 16 which are configured to be connected to flow pipes or other flow components (not shown) by suitable means, such as wing unions 18 (only one of which is shown, mounted on the second end). The valve body 12 includes a flow bore 20 which extends between the first and second ends 14, 16 and a larger diameter cavity 22 which is formed coaxially within the flow bore. The cavity 22 is accessible through a top opening 24 in the valve body 12 which is closed by a removable cap 26 that is threaded into the top opening and is sealed to the valve body by suitable first and second ring seals 28, 30.

The flapper valve 10 includes a flapper 32 which is pivotally connected by a pivot pin 34 to a retainer ring 36. The retainer ring 36 is received in a corresponding pocket 38 formed in the valve body 12 between the top opening 24 and the cavity 22 and is secured therein by a bottom extension 40 of the cap 26. The flapper 32 includes a sealing side 42 which is configured to seal against a cylindrical valve seat 44. The valve seat, which has a through bore 46 of approximately the same diameter as the flow bore 20, is received in a corresponding counterbore 48 in the valve body 12 and is sealed thereto by a pair of ring seals 50, 52. Both the retainer ring 36 and the valve seat 44 are maintained in their proper orientations in the cavity 22 by an alignment pin 54 which extends through a corresponding hole in the retainer ring and into a matching hole in the valve seat.

In operation of the flapper valve 10, fluid flows through the flow bore 20 from the first end 14 to the second end 16 and is prevented from flowing in the opposite direction by the flapper 32. When pressure in the flow bore 20 upstream of the flapper 32 drops to a predetermined level, the flapper pivots downward into a closed position in which the sealing side 42 of the flapper seals against the valve seat 44, thereby preventing fluid from flowing through the flow bore from the second end 16 to the first end 14.

Figure 3:
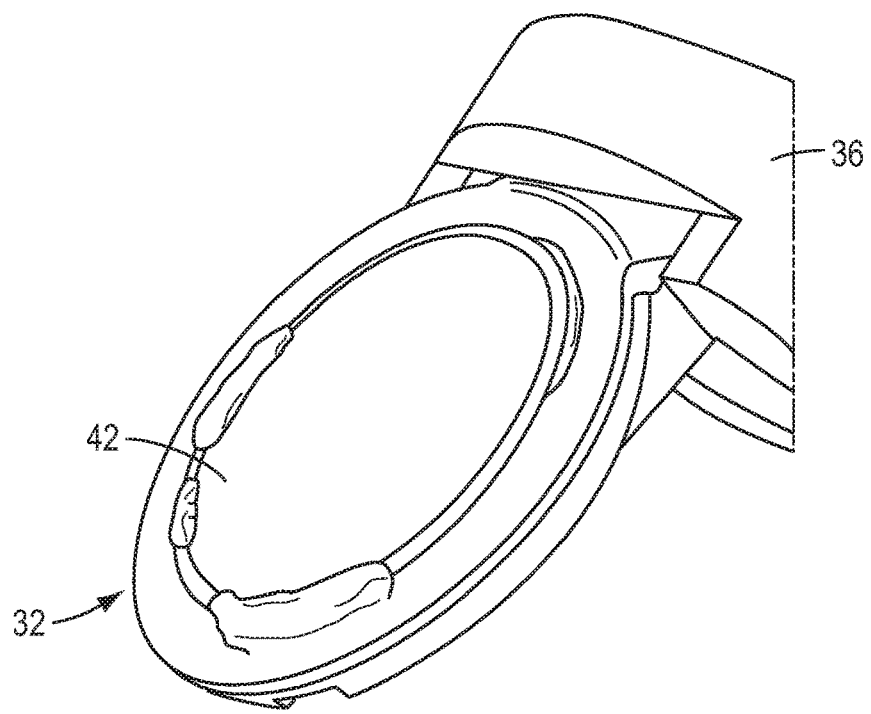
FIGS. 3 and 4 are views of a prior art flapper in which the urethane coating of the flapper has experienced plastic deformation.
Figure 4:
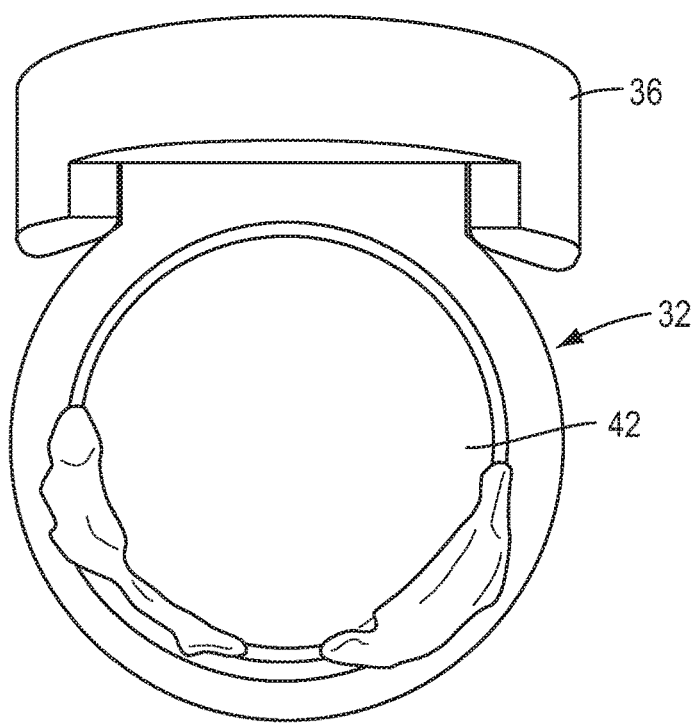

In order to enhance the sealing ability of the flapper 32, the sealing side 42 may be coated with a resilient material, such as a urethane. However, when the pressure in the flow bore 20 exceeds the compressive strength of the resilient coating, the coating can undergo plastic deformation, which can reduce the sealing effectiveness of the flapper valve. Examples of such plastic deformation are shown in FIGS. 3 and 4. In these examples, the flapper has been coated with a urethane material having a compressive strength of approximately 4,500 psi, and the flapper valve has been pressurized to approximately 15,000 psi (a pressure that is becoming increasingly common in certain applications in the hydrocarbon production industry), which resulted in a loading on the sealing side of the flapper of approximately 21,000 psi. FIG. 3 shows that the urethane coating has experienced compression set deformation, which is evidenced by the circular bead that has formed as a result of the urethane being squeezed against the valve seat by the flapper. FIG. 4 shows that the urethane coating has also experienced cold flow deformation, which is evidenced by the area of creep that resulted when the pressure forced the urethane to extrude past the sealing surface of the valve seat.

Figure 5:
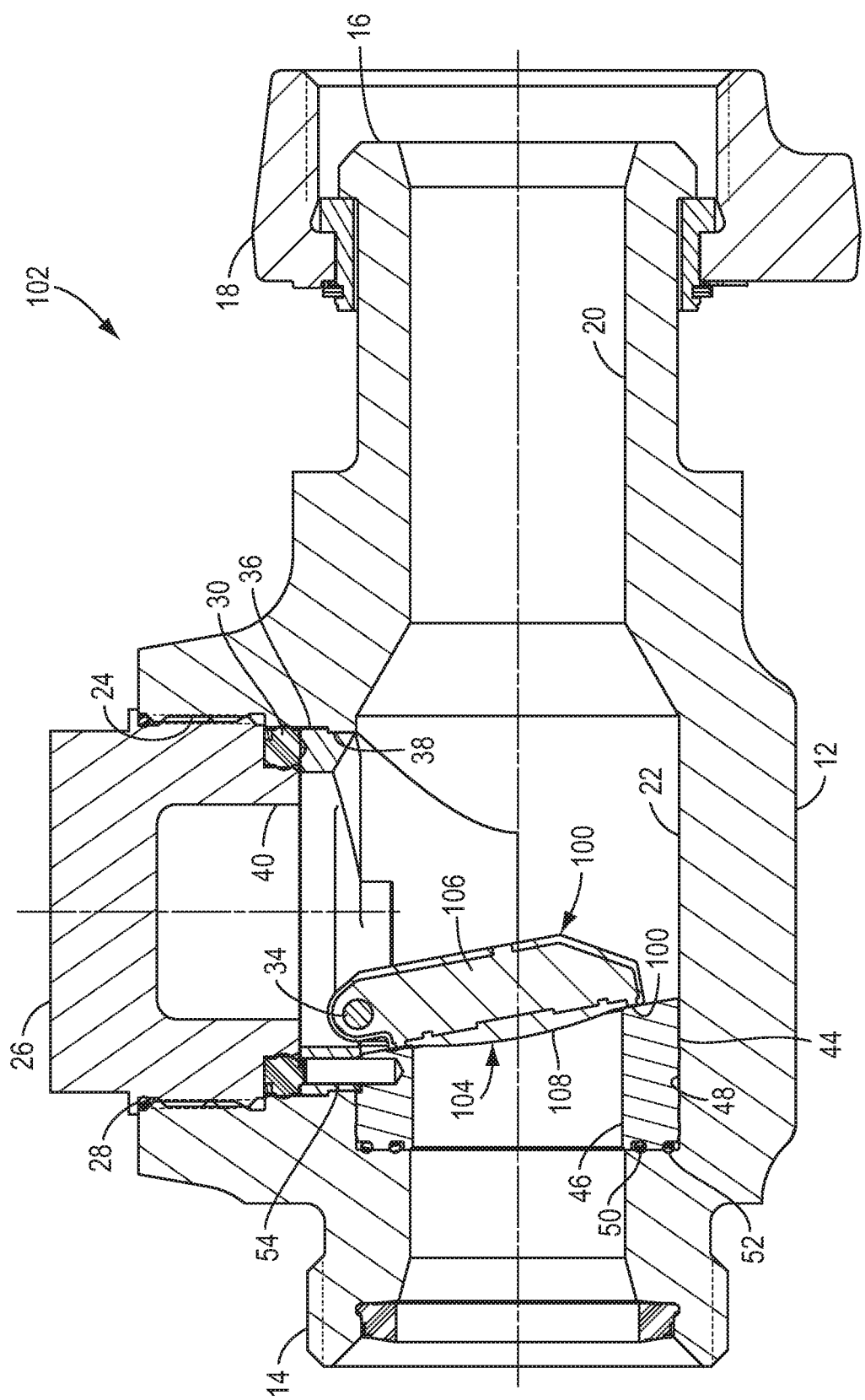
FIG. 5 is a cross sectional view of a flapper valve in accordance with one embodiment of the present invention.
Figure 6:
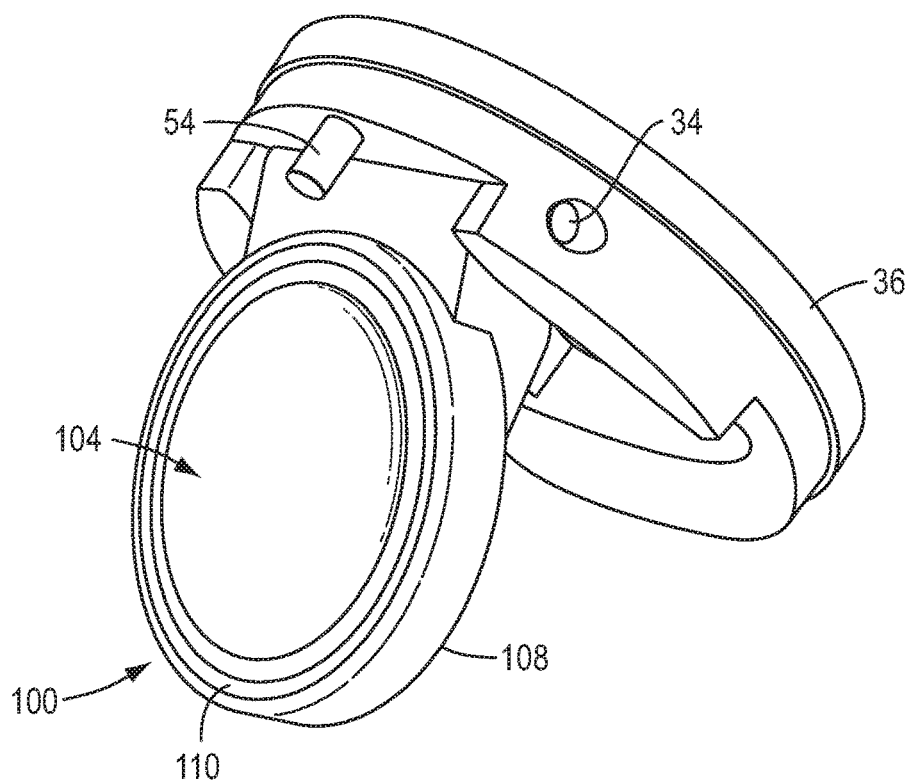
FIG. 6 is a perspective view of the flapper and retainer ring components of the flapper valve shown in FIG. 5.
Figure 7:
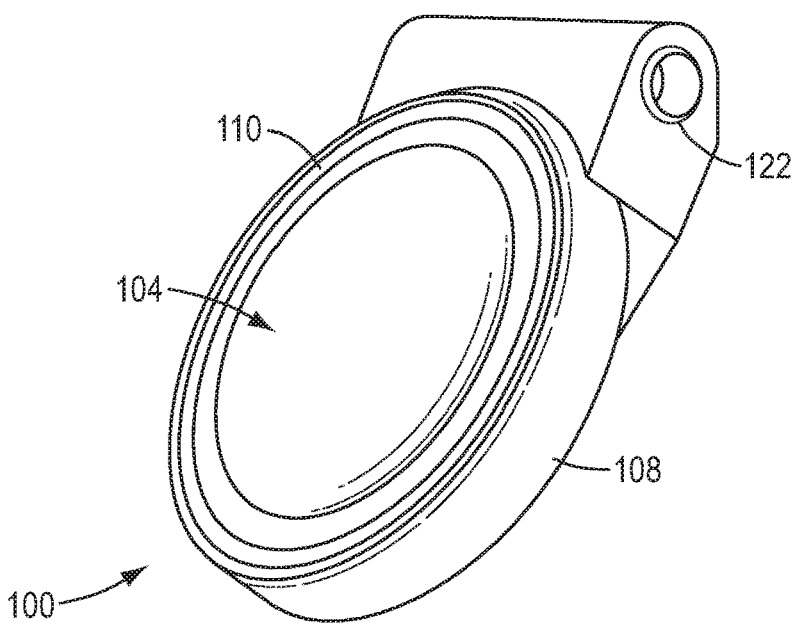
FIG. 7 is a perspective view of the flapper component shown in FIG. 6.
Figure 8:
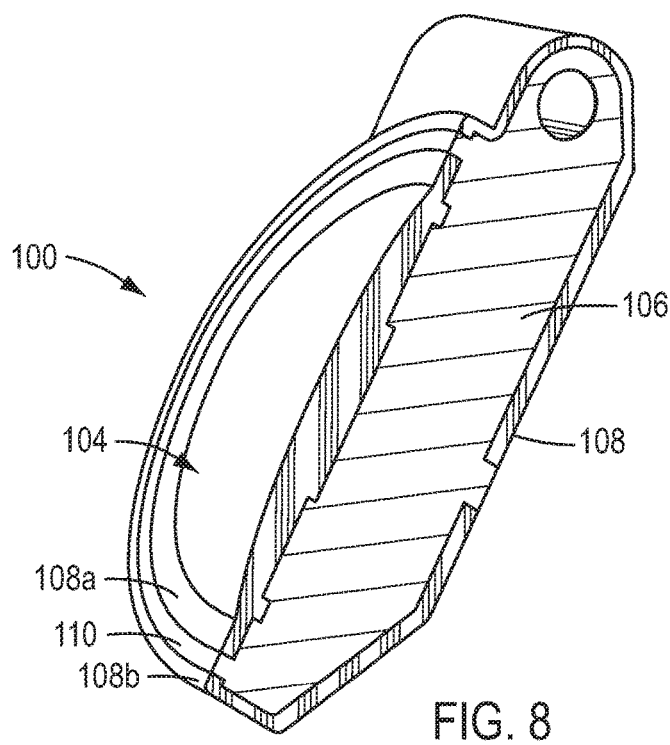
FIG. 8 is a perspective cross sectional view of the flapper component shown in FIG. 7.

In accordance with the present invention, an improved flapper is provided which is capable of reducing or eliminating plastic deformation of its resilient coating, thereby maintaining the sealing effectiveness of the flapper. Referring to FIG. 5, the improved flapper, which is indicated generally by reference number 100, is shown installed in a flapper valve 102 which is identical in most respects to the flapper valve 10 described above. Therefore, a detailed description of the components of the flapper valve 102 is not required, these being the same as those of the flapper valve 10 and being labeled accordingly.

As shown in FIG. 5, the flapper 100 is pivotally connected to a retainer ring 36 which is received in a corresponding pocket 38 formed in the valve body 12 between the cavity 22 and the top opening 24. The flapper 100 comprises a sealing side 104 which engages a valve seat 44 having a through bore 46 that is aligned with the through bore 20 through the valve body 12. The flapper 100 is comprised of a rigid, preferably metal core 106 which is covered to an extent with a coating 108 made from a resilient material. In one embodiment of the invention, the coating 108 may be a urethane which is applied to the core 106 using an injection molding process familiar to those of ordinary skill in the art. In accordance with the present invention, the flapper 100 also includes a stop ring 110 to limit the extent to which the resilient coating 108 is compressed against the valve seat 44 when the flapper is in its closed position.

Figure 9:
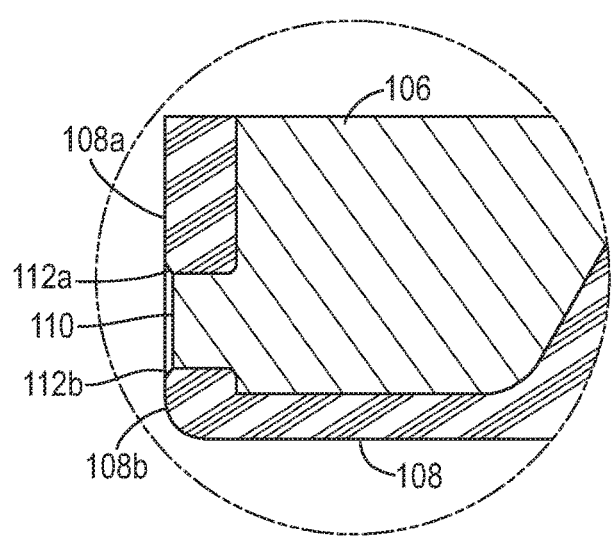
FIG. 9 is an enlarged view of a portion of the flapper of FIG. 8 showing the relative positions of the stop ring and inner and outer radial portions of the resilient coating.
Figure 9A:
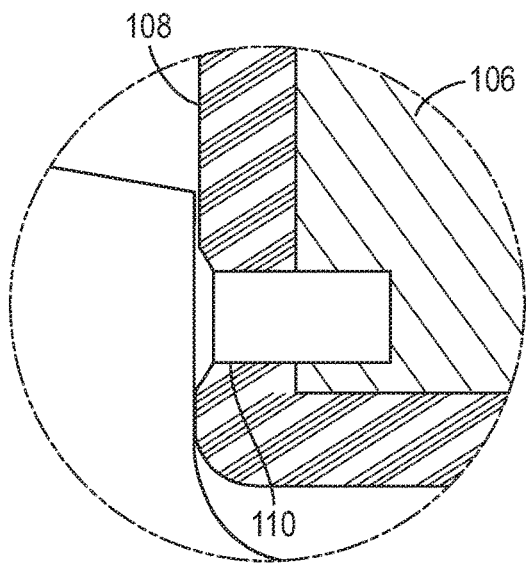
FIG. 9A is an enlarged view similar to FIG. 9 but showing the stop ring as a separate component which is secured in a corresponding groove in the flapper.

Referring also to FIGS. 6-9, the stop ring 110 is incorporated into the core 106 on the sealing side 104 of the flapper 100 and is configured to engage the valve seat 44 when the flapper is in its closed position. The stop ring 110 may be formed integrally with the core 106 (FIG. 9) or be formed as a separate ring which is secured in a corresponding recess in the core (FIG. 9A). As shown best in FIGS. 8 and 9, the stop ring 110 separates the coating 108 on the sealing side 104 of the flapper 100 into radially inner and outer portions 108a, 108b which are configured to sealingly engage the valve seat 44 when the flapper is in its closed position. In use, when the flapper 100 is closed and the pressure in the flapper valve 102 increases, the stop ring 110 will limit the extent to which the radially inner and outer portions 108a, 108b can be compressed against the valve seat 44. As shown in FIG. 9, the radially outer periphery of the inner radial portion 108a and the radially inner periphery of the outer radial portion 108b may be beveled at 112a and 112b, respectively, in order to provide a space into which the coating can be displaced when the flapper 100 is forced against the valve seat 44.

In this regard, the stop ring 110 and the radially inner and outer portions 108a, 108b can be dimensioned to prevent the pressure exerted on the radially inner and outer portions from exceeding the compressive strength of the coating 108 when the flapper valve 102 is pressurized to its maximum working pressure. In this manner, the stop ring 110 will prevent compression set plastic deformation of the coating 108 and thereby ensure that the radially inner and outer portions 108a, 108b will form an effective seal against the valve seat 44 when the flapper 100 is in its closed position. In addition, the stop ring 110 is preferably configured to form a uniformly tight fit with the valve seat 44 when the flapper valve 102 is pressurized to thereby prevent the radially outer portion 108b of the coating 108 from extruding through the interface between the stop ring and the valve seat. Accordingly, the stop ring 110 will prevent cold flow plastic deformation of the radially outer portion 108b of the coating 108.

Figure 10:
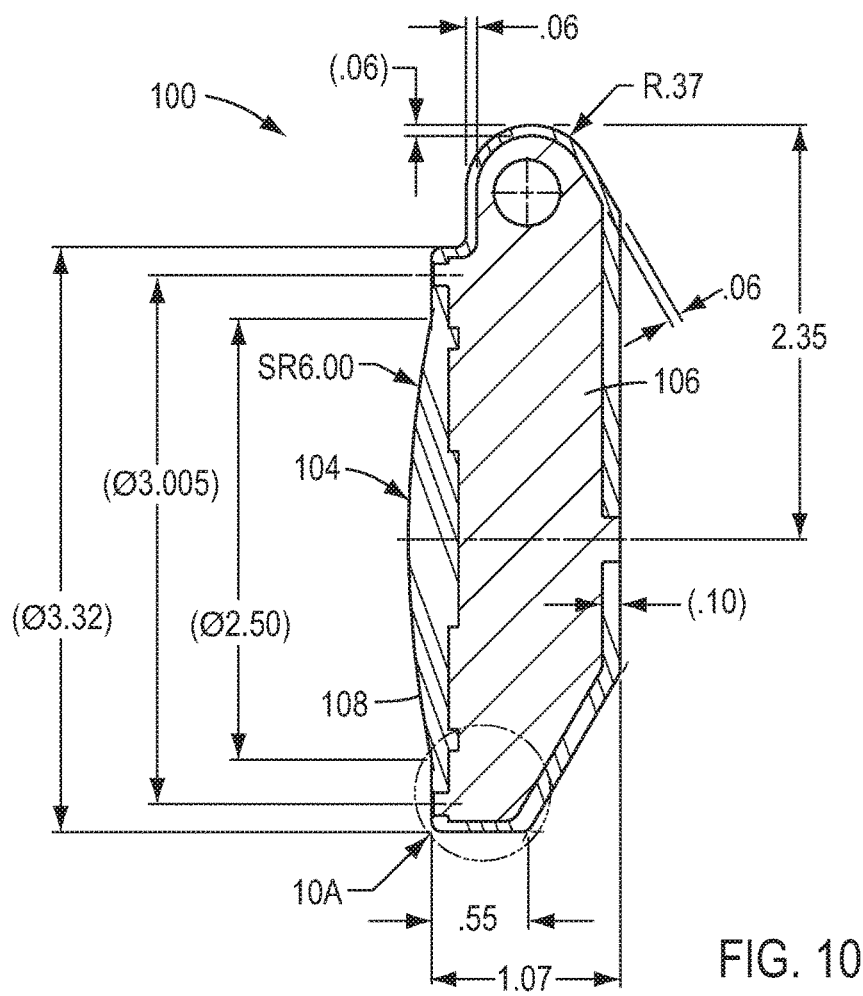
FIG. 10 is a cross sectional view of the flapper shown in FIG. 7.
Figure 10A:
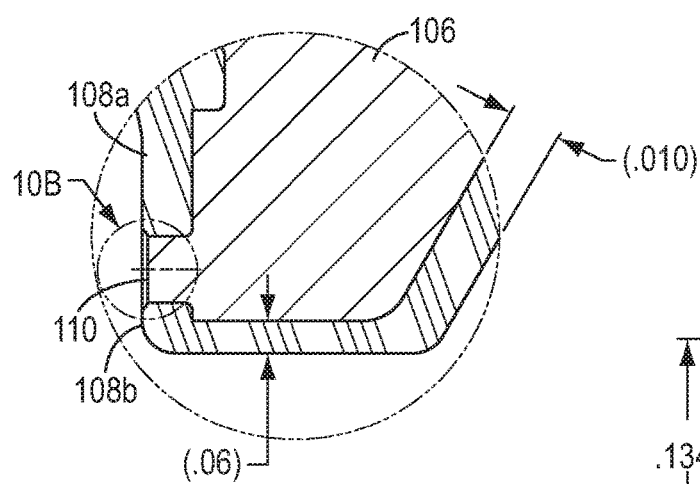
FIG. 10A is an enlarged view of the portion of FIG. 10 designated 10A.
Figure 10B:
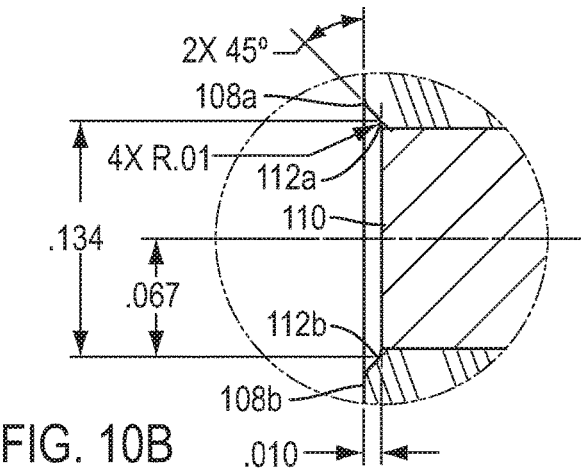
FIG. 10B is an enlarged view of the portion of FIG. 10A designated 10B.

An illustrative embodiment of a flapper 100 constructed in accordance with the present invention is shown in FIGS. 10, 10A and 10B. These figures provide specific dimensions for the stop ring 110 and the radially inner and outer portions 108a, 108b of the coating which the inventor believes will eliminate plastic deformation of these portions of the coating 108 and achieve an effective seal between the flapper 100 and the valve seat 44 under relatively high working pressures. However, these dimensions should not be taken as limiting the scope of the invention in any respect, as it is contemplated that other dimensions and configurations for the stop ring 110 and the coating 108 will provide similar benefits.

Figure 11:
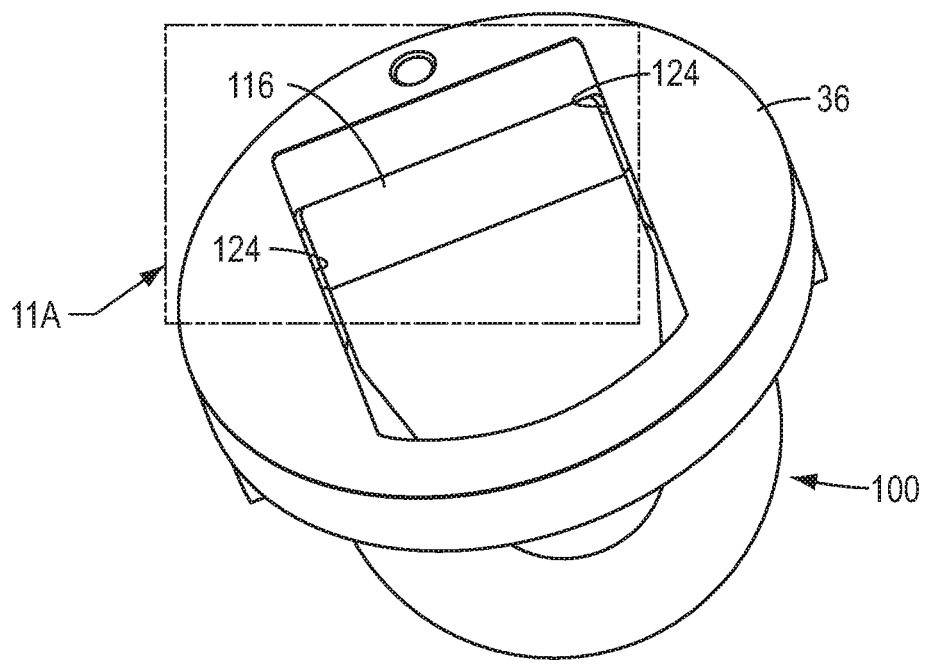
FIG. 11 is a top perspective view of the flapper and retainer ring components of the flapper valve shown in FIG. 5.
Figure 11A:
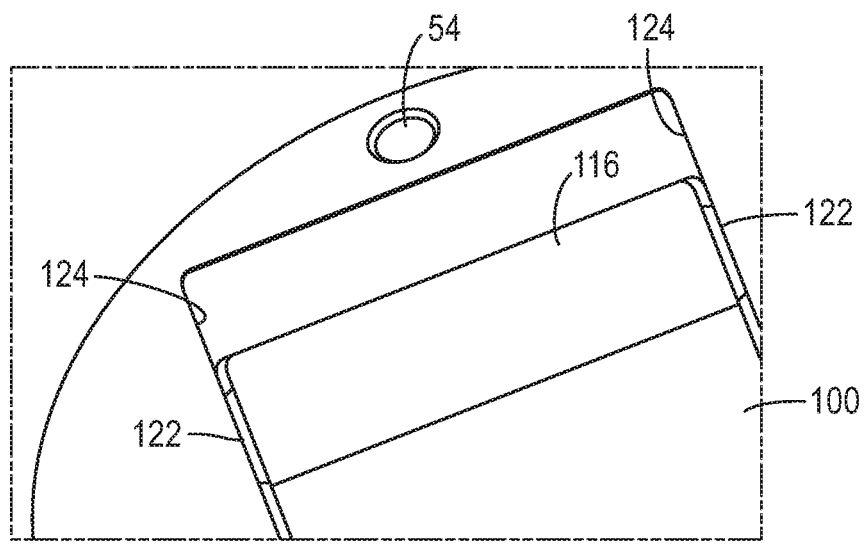
FIG. 11A is an enlarged view of the portion of FIG. 11 designated 11A.
Figure 12:
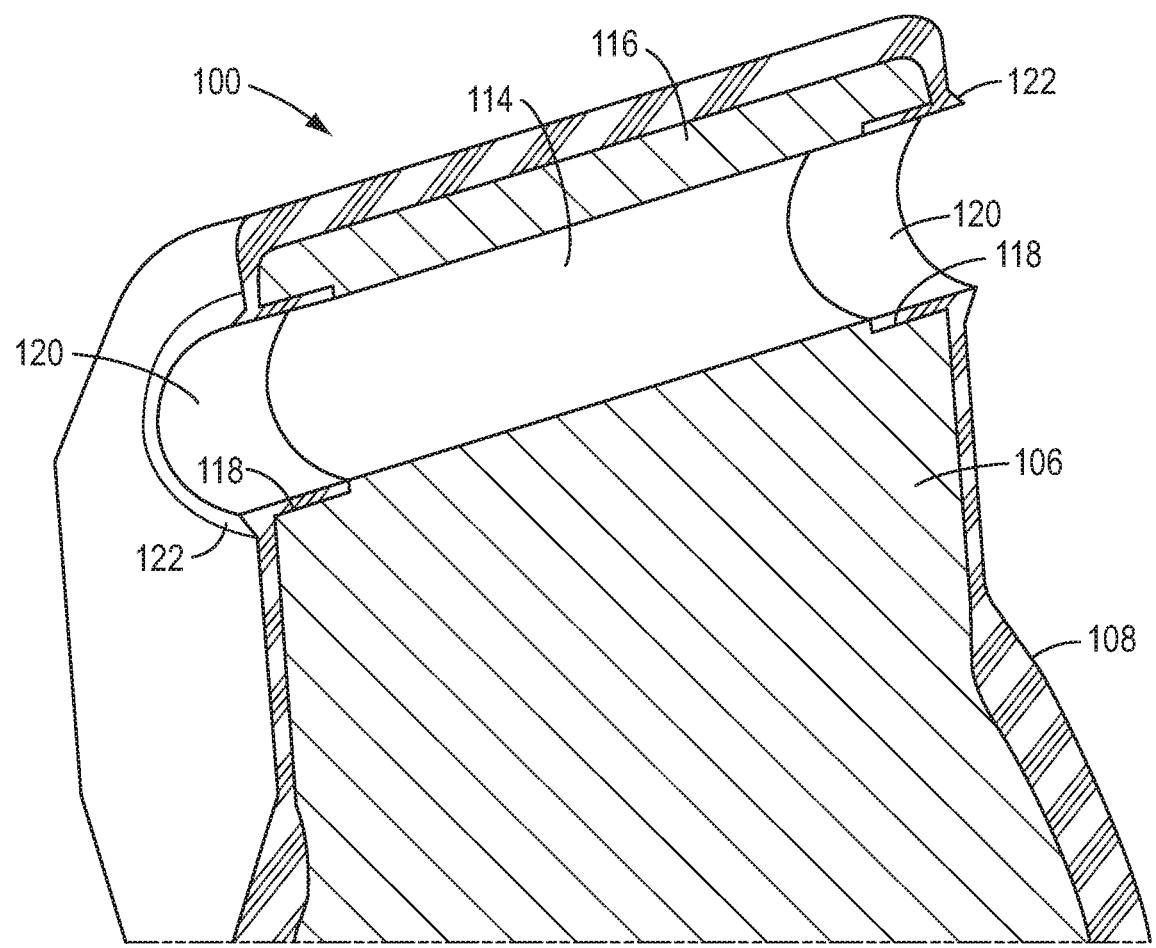
FIG. 12 is a perspective cross sectional view of a portion of the flapper shown in FIG. 11.

Another problem with existing flapper valves is that the pivot pin 34 is subject to wear when the flapper is repeatedly pivoted open and closed in the presence of abrasive fluids in the flapper valve. In accordance with another aspect of the present invention, this problem is reduced or eliminated by providing the flapper 100 with means for sealing the pivot pin 34 from the fluid in the flapper valve. Referring to FIGS. 5 and 12, the pivot pin 34 is positioned in a through hole 114 which extends through a hinge portion 116 of the flapper 100. As shown in FIG. 12, the ends of the through hole 114 comprise annular recesses 118 which during the coating process are filled with the resilient coating 108 to thereby form corresponding cylindrical rings 120 having an inner diameter the same as or slightly smaller than the diameter of the through hole. In addition, during the coating process circular ridges 122 projecting from the sides of the flapper 100 adjacent the ends of the through hole 114 are formed contiguous with the rings 120. As shown in FIGS. 11 and 11A, the ridges 122 are configured such that, when the flapper 100 is mounted in the retainer ring 36, the ridges will be squeezed against the inner sides of the retainer ring. This action will compress the rings 120 against the pivot pin 34 and effectively prevent abrasive fluid in the flapper valve 102 from contacting the pivot pin. In this manner, the pivot pin 34 will be protected against abrasive wear as the flapper 100 is repeatedly pivoted open and closed.

Figure 13:
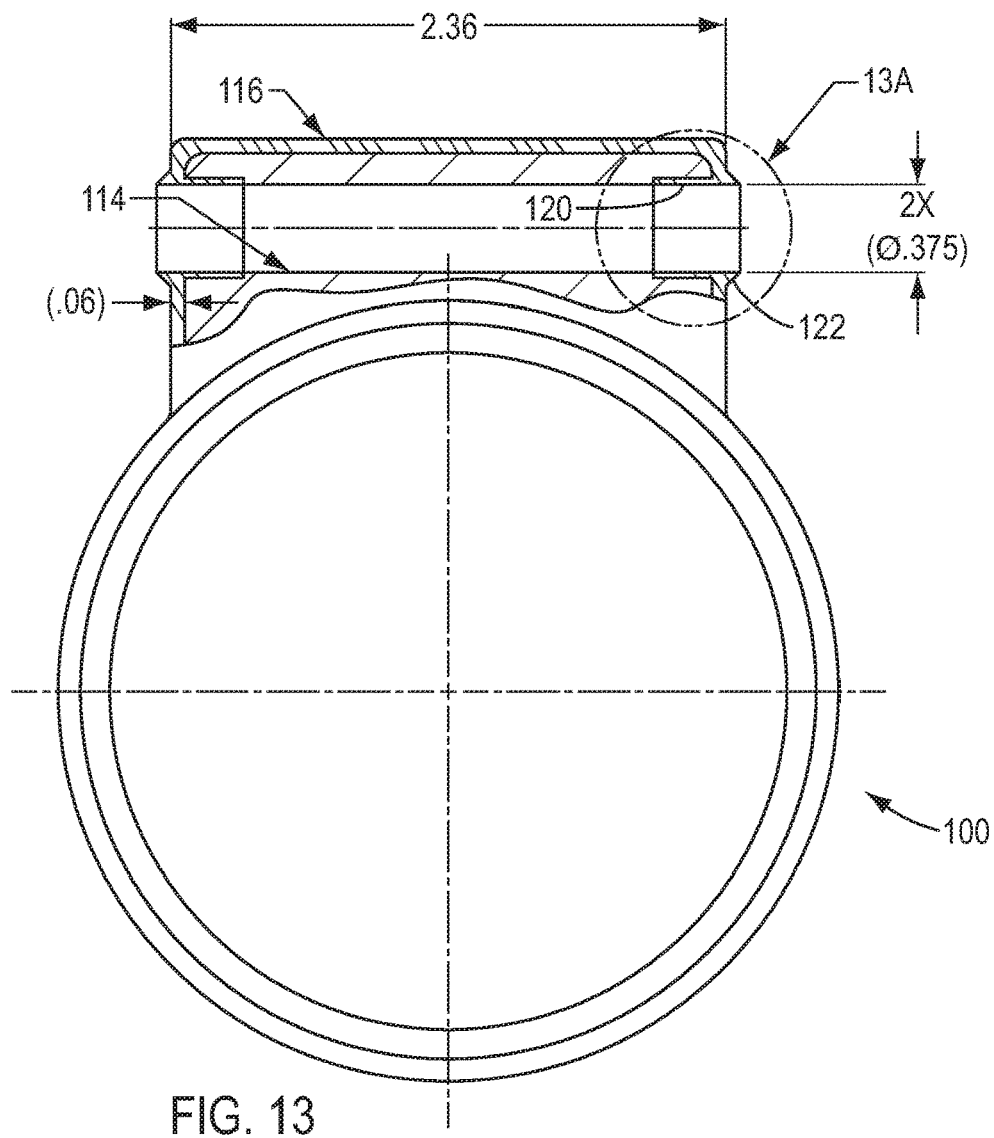
FIG. 13 is a partial cross sectional view of the flapper shown in FIG. 11.
Figure 13A:
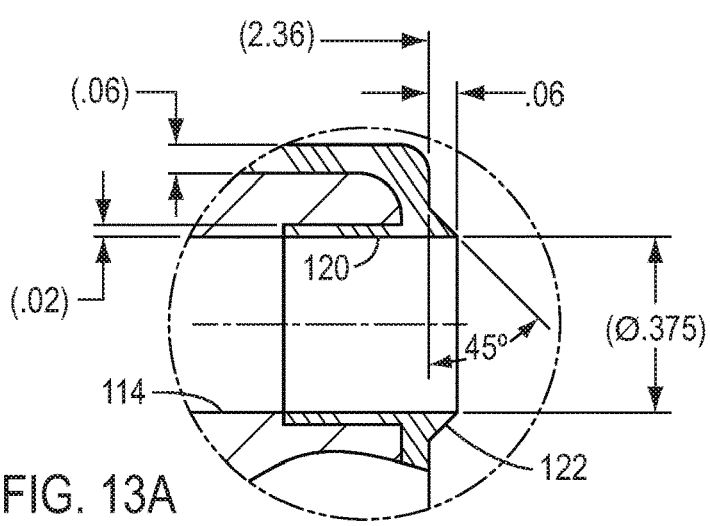
FIG. 13A is an enlarged view of the portion of FIG. 13 designated 13A.

An illustrative embodiment of the flapper 100 which incorporates the resilient rings 120 and ridges 122 just described is shown in FIGS. 13 and 13A. These figures provide specific dimensions for the rings 120 and ridges 122 which the inventor believes will eliminate abrasive wear of the pivot pin. However, these dimensions should not be taken as limiting the scope of the invention in any respect, as it is contemplated that other dimensions and configurations for the rings 122 and ridges 122 will provide similar benefits.

It should be recognized that, while the present invention has been described in relation to the preferred embodiments thereof, those skilled in the art may develop a wide variation of structural and operational details without departing from the principles of the invention. For example various features of the different embodiments may be combined in a manner not described herein. Therefore, the following claims to be construed to cover all equivalents falling within the true scope and spirit of the invention.

What is claimed is:

1. A flapper valve which comprises:
   a valve body which includes first and second ends, a flow bore which extends between the first and second ends, and an enlarged diameter cavity which intersects the flow bore;
   a valve seat which comprises a through bore that is aligned with the flow bore;
   a retainer which is positioned radially outwardly of the cavity; and
   a flapper which is pivotally connected to the retainer, the flapper comprising:
      a sealing side which is configured to engage the valve seat when the flapper is in a closed position;
      a core which is made of a rigid material, the core having a first side which corresponds to the sealing side of the flapper;
      a continuous circular stop ring which is connected to or formed integrally with the core on the sealing side of the flapper, the stop ring projecting outwardly from the first side of the core and being configured to engage the valve seat when the flapper is in the closed position; and
      a resilient coating which includes at least one of a radially inner portion that is disposed on the core radially inwardly of the stop ring and a radially outer portion that is disposed on the core radially outwardly of the stop ring, the at least one of the radially inner portion and the radially outer portion being configured to sealingly engage the valve seat when the flapper is in the closed position;
      wherein the stop ring and the at least one of the radially inner portion and the radially outer portion are configured such that, as the flapper moves into the closed position, the at least one of the radially inner portion and the radially outer portion will engage the valve seat before the stop ring engages the valve seat;
      whereby the stop ring limits the extent to which the at least one of the radially inner and the radially outer portion is compressed against the valve seat when the flapper is in the closed position.

2. The flapper valve of claim 1, wherein at least one of a radially outer periphery of the inner radial portion and a radially inner periphery of the outer radial portion is beveled to thereby define a space into which the resilient coating can be displaced when the flapper is in the closed position.

3. The flapper valve of claim 1, wherein the stop ring and the at least one of the radially inner portion and the radially outer portion are dimensioned such that, when the flapper valve is pressurized to a maximum working pressure, a resulting pressure exerted on the at least one of the radially inner portion and the radially outer portion does not exceed a compressive strength of the resilient coating.

4. The flapper valve of claim 1, wherein the resilient coating includes at least a radially outer portion which is disposed on the core radially outwardly of the stop ring and the stop ring is configured to form a uniformly tight fit with the valve seat to thereby prevent the radially outer portion from extruding through an interface between the stop ring and the valve seat.

5. The flapper valve of claim 1, wherein the flapper is pivotally connected to the retainer by a pivot pin which is positioned in a through hole that extends through a hinge portion of the flapper, and wherein the flapper valve further comprises means for sealing the pivot pin from a fluid in the cavity.

6. The flapper valve of claim 5, wherein the means for sealing the pivot pin includes a pair of resilient circular ridges, each of which projects from a corresponding side of the hinge portion coaxially with the through hole and sealingly engages the retainer.

7. The flapper valve of claim 6, wherein the pair of resilient circular ridges are formed integrally with the resilient coating.

8. The flapper valve of claim 5, wherein the means for sealing the pivot pin includes a pair of resilient rings, each of which is positioned in a corresponding end of the through hole and comprises an inner diameter which is smaller than a diameter of the through hole.

9. The flapper valve of claim 8, wherein the pair of resilient rings are formed integrally with the resilient coating.

10. The flapper valve of claim 8, wherein each of the pair of resilient rings is positioned in corresponding recesses which is located in a corresponding end of the through hole.

11. The flapper valve of claim 8, wherein the means for sealing the pivot pin further includes a pair of resilient circular ridges, each of which projects from a corresponding side of the hinge portion coaxially with the through hole and sealingly engages the retainer.

12. The flapper valve of claim 11, wherein the pair of resilient rings and the pair of resilient circular ridges are formed integrally with each other.

13. The flapper valve of claim 12, wherein the pair of resilient rings and the pair of resilient circular ridges are formed integrally with the resilient coating.

\* \* \* \* \*